United States Patent [19]

Stephan

[11] Patent Number: 5,690,710

[45] Date of Patent: Nov. 25, 1997

[54] SELF-CLEANING FILTER

[76] Inventor: Paul F. Stephan, 1205 Sheppard Rd., Rockton, Ill. 61072

[21] Appl. No.: 665,253

[22] Filed: Aug. 13, 1996

[51] Int. Cl.$^6$ .................................................. B01D 45/02
[52] U.S. Cl. ............................. 55/366; 55/361; 55/363; 55/379
[58] Field of Search ........................... 55/361, 363, 366, 55/369, 370, 377, 379, DIG. 2, DIG. 3

[56] References Cited

U.S. PATENT DOCUMENTS

| | | | |
|---|---|---|---|
| 2,295,984 | 9/1942 | Wilson | 55/288 |
| 3,195,296 | 7/1965 | Janson | 55/361 |
| 3,877,900 | 4/1975 | Mitchell | 55/366 |
| 4,838,907 | 6/1989 | Perry | 55/366 |

*Primary Examiner*—Jay H. Woo
*Assistant Examiner*—Minh-Chau T. Pham

*Attorney, Agent, or Firm*—Keith Frantz

[57] ABSTRACT

A cloth bag filter is formed with a generally cylindrical porous sidewall through which a vacuum is drawn for filtering of contaminant from an air stream, an open upper end for connection to the vacuum source, and a generally closed but optionally porous lower end portion. The sidewall is sufficiently flexible such that it collapses radially inwardly when air is flowing therethrough, simultaneously causing the lower end portion of the bag to be drawn upwardly toward the upper end portion. Upper and lower rings are secured to the upper and lower end portions of the bag for radially supporting the end portions. The weight of the lower ring causes the lower portion of the bag to automatically drop when the vacuum source is turned off, thus causing the sidewall to automatically expand outwardly to a generally vertically hanging position, disrupting the cohesion of the contaminant collected thereon, and causing such contaminant to break-up and fall from the filter.

11 Claims, 4 Drawing Sheets

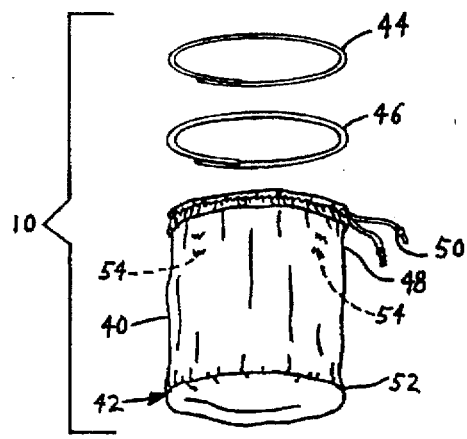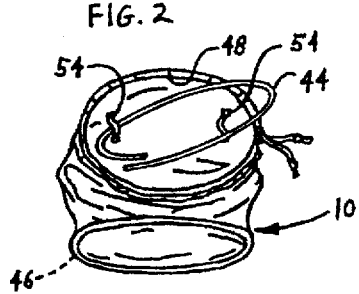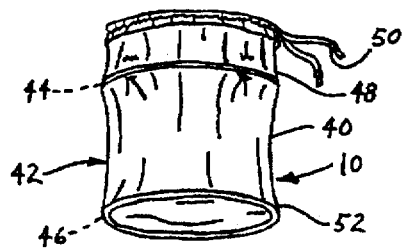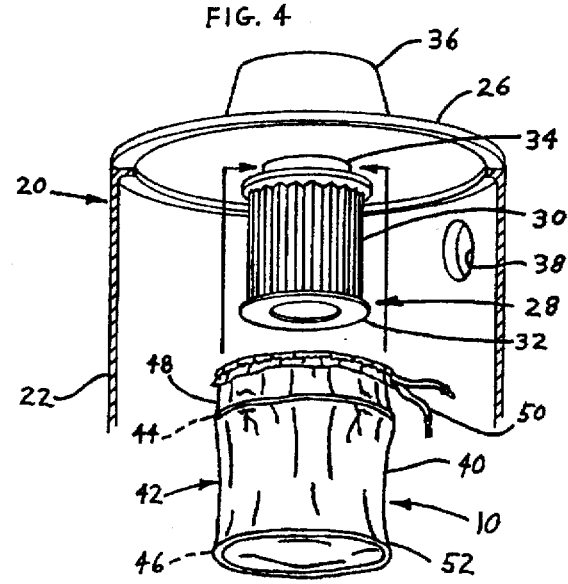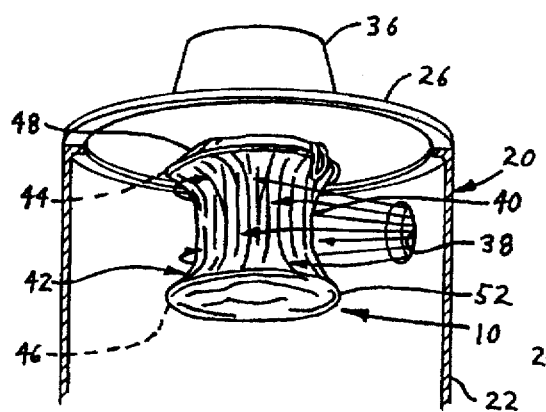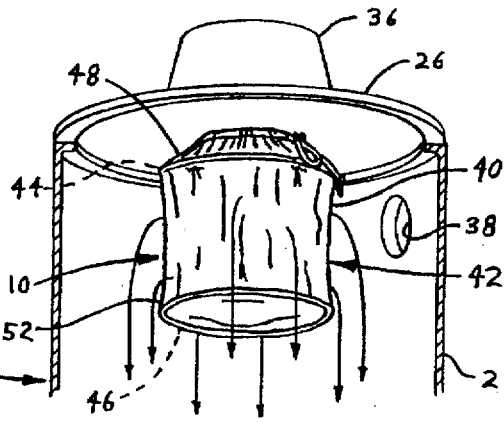

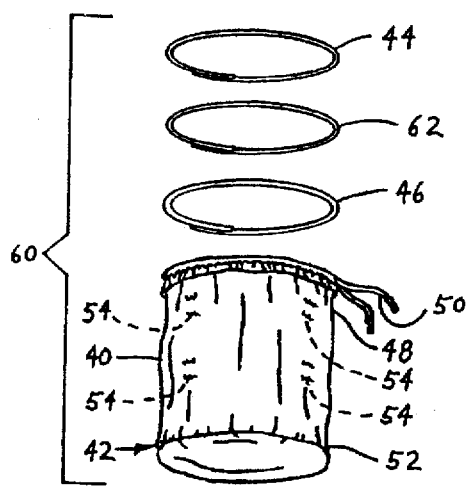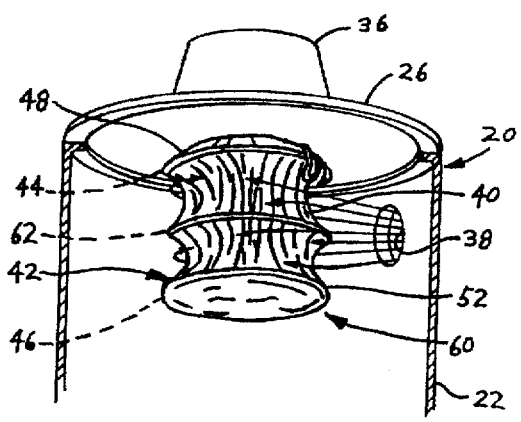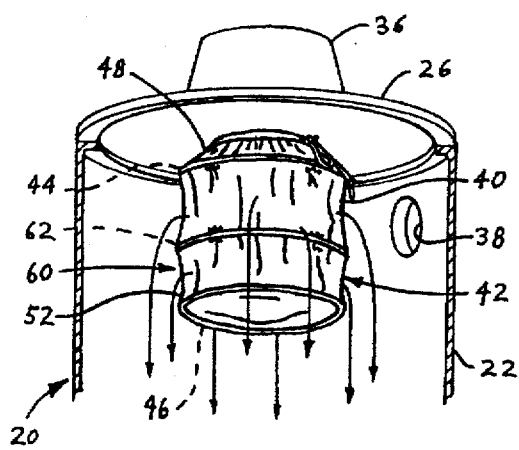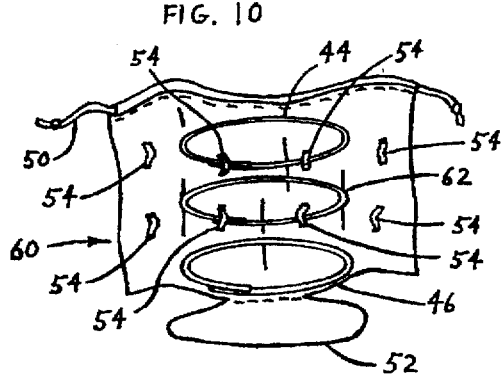

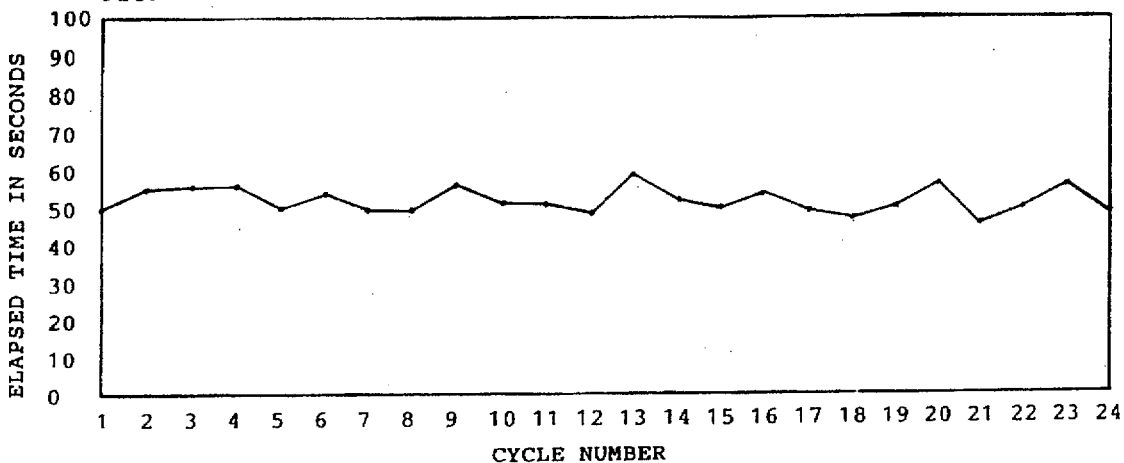
FIG. 13
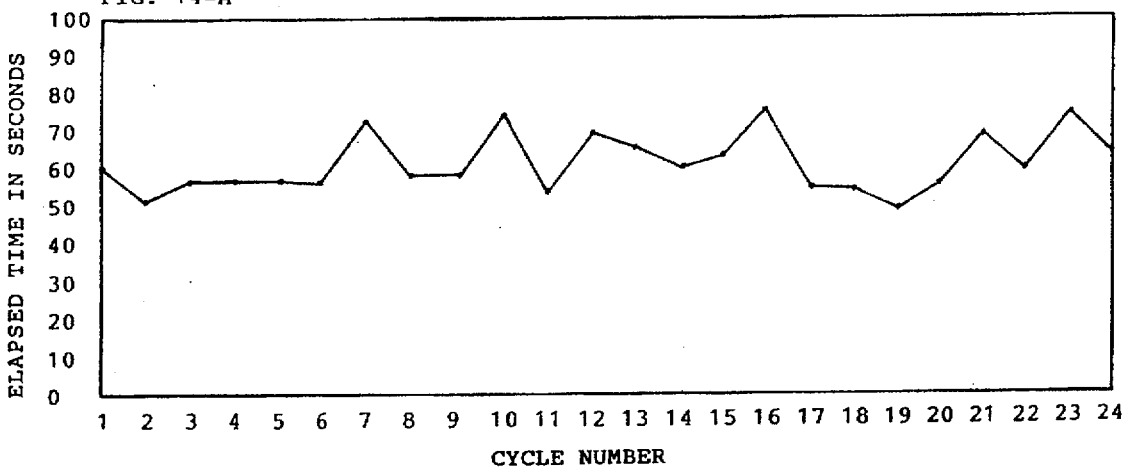
FIG. 14-A
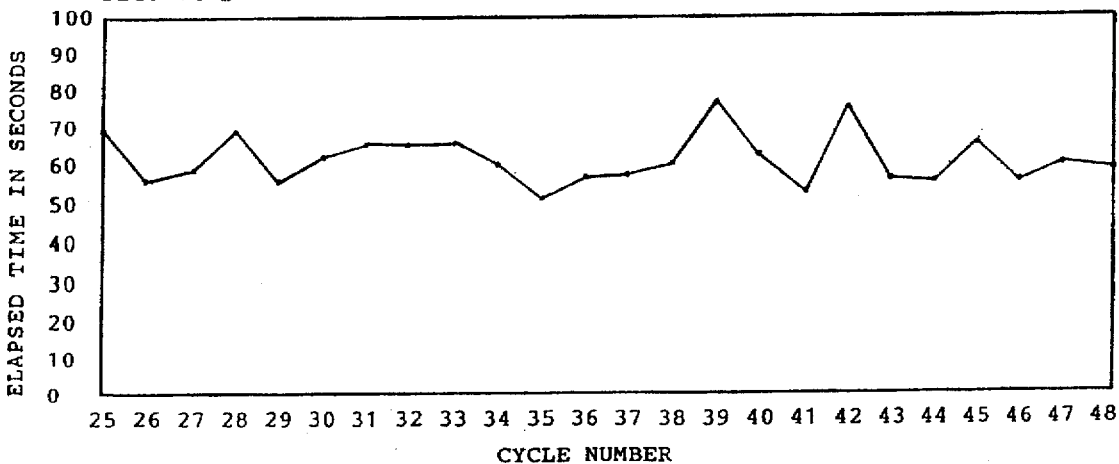
FIG. 14-B 5,690,710

1

SELF-CLEANING FILTER

BACKGROUND OF THE INVENTION

This invention relates generally to a filter for removing entrained particulate matter from a stream of air. More specifically, the invention relates to a self-cleaning bag-type cloth filter which is particularly useful as a pre-filter in a vacuum cleaner such as a shop-vac adapted for dry pick-up of dust and debris.

A conventional shop-vac includes a generally upright particulate receiver or canister and a lid which is removably connected to and which generally closes off the upper end of the canister. A vacuum source connected to the lid draws contaminated air through an inlet opening in the canister and then through an exit opening in the lid. A generally cylindrical foam or paper filter with an open upper end in communication with the exit opening in the lid and a closed lower end is typically connected to the underside of the lid and extends downwardly into the canister.

During normal operation of the shop-vac, the vacuum source draws contaminated air into the canister and then through the pleated paper filter for removal of particulate from the air stream, whereupon the air exits the upper end of the filter and through the exit opening in the lid. With this arrangement, the vacuum source causes a build-up of particulate on the side of the filter. After a certain quantity of contaminant or debris builds-up on the outside of the filter, or when the vacuum source is turned off, the build-up may or may not fall from the filter. There is currently no simple mechanism or method for ensuring that the contaminant falls from either a standard filter or from a bag-type filter. Thus, such filters tend to become clogged after a period of use and require cleaning or replacement before the shop-vac is again operational.

SUMMARY OF THE INVENTION

The general aim of the present invention is to provide a new and improved self-cleaning filter adapted for use in vacuum cleaner to reduce the need to open the vacuum cleaner and to clean or replace the filter.

A detailed objective is to achieve the foregoing by providing a filter adapted for automatic transition between (1) a filtering mode and (2) a cleaning mode.

A more detailed objective is to provide a flexible filter which is adapted to collapse inwardly during operation of the vacuum cleaner and during removal of particulate from contaminated air, and which is further adapted to automatically expand outwardly to a predetermined position when the vacuum cleaner is turned off so as to disrupt the cohesion of particulate collected on the filter and to allow such particulate to fall from the filter.

These and other objectives and advantages of the invention will become more apparent from the following detailed description when taken in conjunction with the accompanying drawings.

The foregoing is achieved, in part, by providing a unique filtering arrangement including (1) a cloth filter bag having an open upper end connected in communication with the vacuum source, having a filtering sidewall through which the contaminated air is drawn, and having a generally closed lower end, and (2) upper and lower ring members connected to the upper and lower ends, respectively, of the filter bag for normally maintaining the filtering sidewall of the bag in a generally vertical extending position.

During a vacuum cleaning operation, contaminated air is drawn radially inwardly through the side of the filter and

2 then out the open upper end of the filter. The pressure differential across the filter draws the side of the filter inwardly while particulate is filtered from the air and collected thereon. When the vacuum is turned off, the weight of the lower ring causes the lower portion of the filter to drop, automatically expanding the side of the filter outwardly and thus causing particulate that has collected thereon to break apart and fall from the filter. As a result, the filter automatically cycles between a collapsed filtering position and an expanded position to activate the self-cleaning mechanism of the filter each time the vacuum cycles on and then off.

BRIEF DESCRIPTION OF THE DRAWINGS

FIG. 1 is an exploded perspective view of a new and improved self-cleaning filter incorporating the unique features of the present invention.

FIG. 2 is a perspective view of the parts of FIG. 1 substantially assembled together.

FIG. 3 is a perspective view of the fully assembled filter.

FIG. 4 is an exploded perspective view of the filter and a standard shop-vac with certain parts broken away and shown in cross-section.

FIG. 5 is a perspective view showing the filter installed in the shop-vac, and showing the filter in its operative filtering position during normal vacuum operation of the shop-vac.

FIG. 6 is a view similar to FIG. 5, but showing the filter in its expanded position resulting from turning the shop-vac off.

FIGS. 7, 8, and 9 are views similar to FIGS. 1, 5, and 6, respectively, of an alternate embodiment of the present invention.

FIG. 10 is a perspective view of the parts shown in FIG. 7, with a certain part shown as if cut longitudinally and laid out substantially flat.

FIGS. 13 and 14A, 14B are graphs depicting certain test results conducted with a shop-vac equipped with a self-cleaning filter of the present invention.

Figure 11:
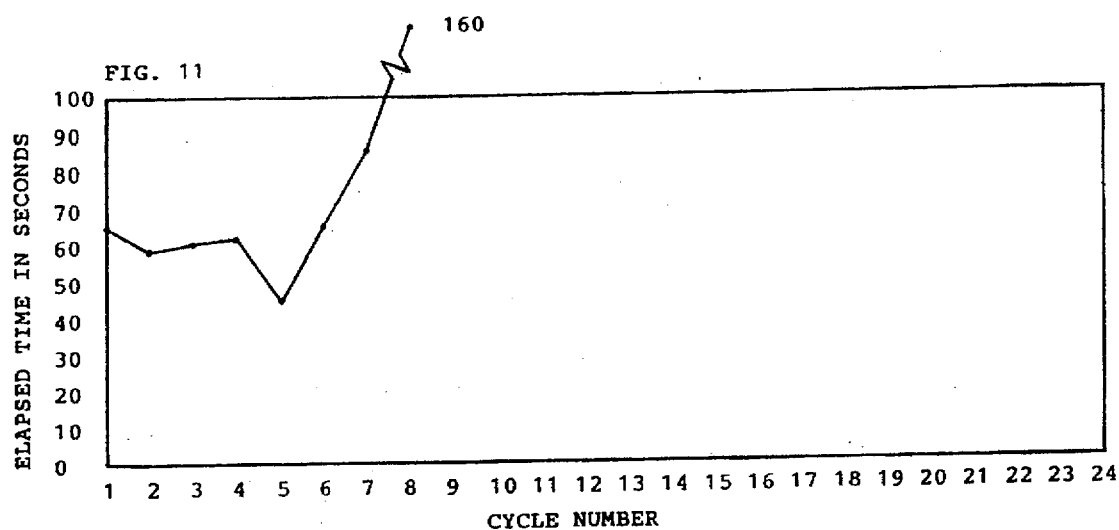
FIGS. 11 and 12 are graphs depicting certain test results conducted with a shop-vac equipped with a standard prior art filter.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENT

For purposes of illustration, the present invention is shown in the drawings as embodied in a filter 10 (FIG., 1) adapted for use as a pre-filter in a vacuum cleaner such as a standard shop-vac 20 (FIG. 4).

The shop-vac 20 includes a generally upright canister 22 having an open upper end, a lid 26 removably connected to and generally closing the upper end of the canister, a filter 28 connected to the underside of the lid and extending downwardly into the canister, and the filter 10 generally surrounding the filter 28 (see e.g., FIGS. 5 and 6).

The filter 28 includes a generally cylindrical pleated paper filter section 30, a base 32 connected to and closing off the bottom of the paper filter 30, and an upper end portion 34 adapted for connection to the lid 26. The upper end of the filter 28 is generally open to allow communication between the interior of the paper filter 30 and a centrally located exit opening (not shown) formed in the lid.

During normal operation of the shop-vac 20, a vacuum source (not shown) located in a housing 36 on the outside of the lid 26 draws air through an inlet opening 38 (see FIG. 5) in the canister 22, inwardly through the filters 10 and 28 for removal of debris from the air, and then through the exit opening in the lid.

In accordance with the present invention, the filter 10 is uniquely adapted for automatic self-cleaning each time the shop-vac 20 is turned off. As a result, the filter 10 substantially reduces the frequency of either the filter 10 or the filter 28 becoming clogged, and thus reduces the need to open the shop-vac for cleaning or replacement of either filter.

In general, the filter 10 includes a filter element 40 which is relatively flexible and which is positioned in the air stream for removal of particles therefrom. As a result of the flexibility of the filter element 40 and the pressure drop across the filter element, the filter element bows or collapses in the direction of the air flow as the air passes through it. As further described below, the filter 10 is also provided with a biasing force which tends to counteract the collapsing force of the air flow on the filter element. When the shop-vac 20 is turned off, this biasing force generally straightens out the filter element and causes the particulate that has collected thereon to break up and fall from the filter 10 and into the canister.

More specifically, in carrying one embodiment of the invention, the filter 10 includes a generally porous or air pervious cloth-like filter bag 42, and upper and lower split expansion rings, 44 and 46, respectively. The filter bag is formed with a generally cylindrical sidewall 40, an open upper end with a drawstring 50 circumferentially located therein, and a generally closed but optionally porous lower end portion 52. The drawstring, for example, is utilized to connect the filter 10 to the upper band 34 of the filter 28.

The expansion rings 44, 46 are formed with overlapping ends and are preferably formed having a diameter which is approximately equal to the free diameter of the sidewall 40 of the filter bag 42. The lower ring 46 is located in and preferably rests in the bottom of the filter bag. The upper ring 44 is threaded through four cloth loops 54 (FIGS. 2 and 10) sewn onto the inside of the filter bag near the upper end portion 52 thereof by splitting the ends of the ring, slipping one end through each of the loops, and then threading the remainder of the ring through the loops.

By way of example, the filter bag 42 may be a muslin bag with a flat bottom 52, the bag having a diameter of approximately 10½ inches, and a length of 11 inches. In this instance, the loops 54 are positioned 3 inches down from the top of the bag, the lower ring 46 is 10 inches in diameter and made from 0.25 inch diameter (E gauge) wire to easily slip into the bottom of the bag, and the upper ring 44, is 10 inches in diameter and made from 0.128 inch diameter (30 gauge) wire. Advantageously, this general sizing permits the filter 10 to be positioned and to fit loosely over a certain standard sized shop-vac filter 28 (see FIGS. 4–6).

With the above arrangement, and with the filter 10 installed in the shop-vac 20, the flexible sidewall 40 collapses radially inwardly toward the filter 28 when the vacuum source draws air through the shop-vac 20 and therefore through the sidewall 40 as shown in FIG. 5. In this instance, the filter 28 provides a limit to the collapsing movement of the sidewall. Advantageously, the upper and lower rings 44, 46 maintain the upper and lower end portions 48, 52 of the filter bag in a predetermined radial position to keep the entire bag from collapsing inwardly. Moreover, as the side of the filter bag bows inwardly, the lower end portion of the bag is drawn upwardly.

When the shop-vac 20 is turned off, the weight of the lower ring 46 causes the lower end portion of the filter bag 42 to drop downwardly and away from the upper end portion of the filter bag, thus causing the sidewall 40 to expand and generally straighten or hang vertically. As the wall expands outwardly, the cohesion of the particulate that has collected on the filter during the vacuuming operation is disrupted, thus causing the particulate build-up to break apart and fall from the filter into the canister 22. In this instance, the debris collected on the filter 10 during a vacuum cleaning operation is automatically shed from the filter when the vacuum is turned off. Moreover, the expansion rings 44, 46 insure that the sidewall expands outwardly toward a predetermined radial position, i.e., toward the naturally hanging or vertically extending radial position of the rings.

In accordance with an alternate embodiment, a filter 60 is similar to filter 10 but includes a split ring 62 located generally in the center of the filter. The ring 62 is preferably the same diameter as the upper and lower rings 44, 46 and is positioned in the filter by way of additional loops 54 located so as to position the center ring midway between the upper and lower rings. The arrangement of the filter 60 is particularly useful in those instances where the filter element 30 is pleated paper and where the vacuum is especially strong such that the sidewall 40 of the filter 10 might otherwise become lodged between the pleats of the paper filter. In this instance, the center ring 62 limits the radial collapsing movement of the sidewall 40 so as to prevent the sidewall from becoming lodged in the pleats of the filter element 30.

To verify the self-cleaning nature of the filter 10, comparative testing was conducted with a standard, commercially available shop-vac, a 16 gallon capacity Sears model 758.17871 shop-vac. One testing cycle consisted of picking up 16 pounds of a typical mixture of shop dust and debris, and then emptying the shop-vac. The elapsed time to pick-up the dust and debris was measured for each test cycle to identify when the pick-up or suction capacity of the shop-vac diminished substantially, thus identifying when the filter was becoming clogged and needed cleaning or replacing. The testing cycle was then repeated as further discussed below. Two rounds of testing were conducted to insure repeatability of the results, a new (i.e., unused) filter being installed into the shop-vac at the beginning of each round of testing. The results show a substantial difference between the performance or pick-up capacity of a standard filter 28 and a filter 10 of the present invention.

Figure 12:
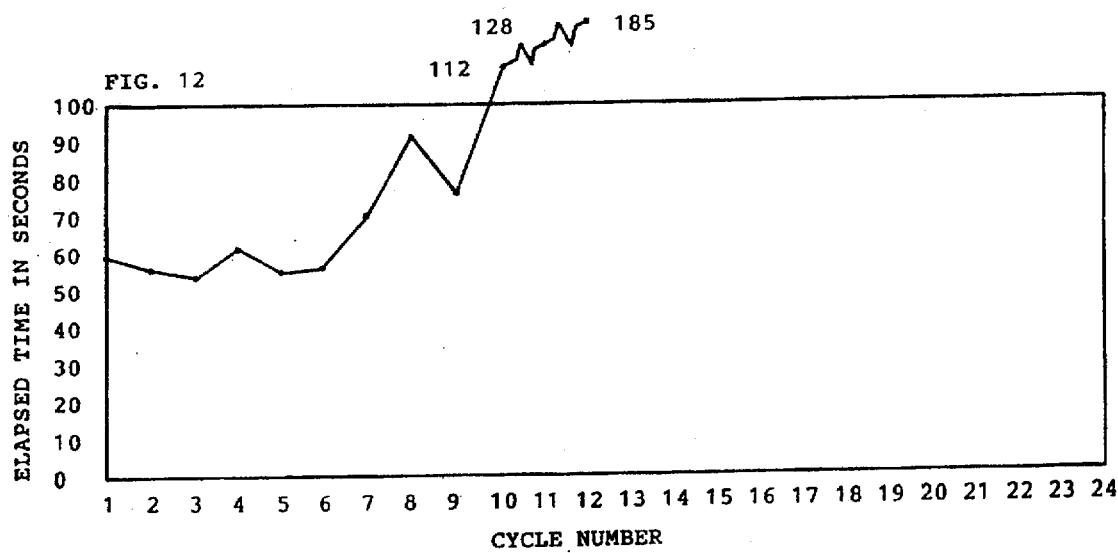

More specifically, FIGS. 11 and 12 depict the test results of a shop-vac equipped with a standard pleated paper filter, Sears part number 17809, during first and second rounds of testing, respectively. As is shown in FIG. 11, the elapsed time to pick-up the 16 pounds of dust and debris during the first round was initially about 65 seconds. This approximate pick-up time was repeated for the next 5 test cycles, after which the time steadily increased. And after just 3 more cycles, or after a total of 8 pick-up cycles, the pick-up time had increased to approximately 160 seconds, indicating a substantial drop in the pick-up capacity of the filter 28.

During the second round of testing, after a new pleated filter was installed, the shop-vac completed 6 cycles with a pick-up time between approximately 55 to 70 seconds, after which the pick-up time again increased. During this round, the pick-up time rose to 128 seconds during the tenth cycle, and to 185 seconds during the twelfth cycle. These results clearly show that a standard pleated filter begins to become clogged after only a few test pick-up cycles, resulting in quickly diminishing pick-up capacity or performance of the shop-vac.

FIGS. 13 and 14A, 14B depict the test results of the same shop-vac equipped with a self-cleaning filter 10 of the present invention positioned over the standard pleated filter 28 (as shown in FIGS. 5 and 6) during the first and second rounds of testing, respectively. And again, new filters were installed at the beginning of each round of testing.

As shown in FIG. 13, the elapsed time to pick-up the 16 pounds of dust and debris during the first test using the filter 10 was initially about 50 seconds. The test cycle was then repeated 23 times for a total of 24 cycles. During this entire round of testing, the pick-up time remained relatively constant, within the range of approximately 50 to 60 seconds. During the second round of testing, the pick-up cycle was conducted 48 times. And as shown in FIGS. 14A, 14B, the pick-up time for all of these cycles remained between a range of approximately 50 to 75 seconds.

The comparative testing clearly indicates that, while the performance of a shop-vac equipped with a standard filter quickly diminishes after only a few cycles, the performance of the same shop-vac equipped with the filter 10 remains relatively constant after picking-up and filtering a substantial quantity of dust and debris.

From the forgoing, it will be apparent that the present invention brings to the art a new and improved filter 10 adapted with a unique self-cleaning mechanism for use in and actuated by an intermittently flowing stream of fluid such as air. By virtue of the flexible filter sidewall 40 which collapses as air flows therethrough, due to the pressure differential across the sidewall, and in combination with the upper and lower rings 44 and 46 which maintain the upper and lower portions of the filter in predetermined radial positions, and including the lower ring which biases the bottom of the filter downwardly and automatically causes the sidewall 40 to expand when the vacuum is turned off, the filter 10 is uniquely adapted for self-cleaning each time the shop-vac is cycled from on to off so as to be relatively clean for the next time the shop-vac is turned on.

I claim:

1. A filtering apparatus for removing entrained particulate from an intermittently flowing stream of fluid, said apparatus comprising:

a filter portion located in the path of the fluid stream and formed from a porous cloth-like material for removal of particulate from the fluid, said filter portion being formed with first and second end portions;

means for holding said first end portion in a first position; and means for biasing said second end portion toward a second position;

said filter portion being sufficiently flexible to bow in the direction of the fluid flow as the fluid flows therethrough such that said second end portion is drawn toward said first end portion;

said biasing means generally straightening said filter portion when said stream is not flowing.

2. A filtering apparatus as defined in claim 1 in which said filter portion hangs substantially vertically when the fluid is not flowing.

3. A filtering apparatus as defined in claim 2 in which said biasing means includes weighted means connected to said second end portion.

4. A filtering apparatus as defined in claim 3 further comprising means for limiting the bowing movement of said filter portion.

5. A filtering apparatus for removing entrained particulate from a stream of fluid, said apparatus comprising:

a generally tubular filter portion formed from a porous material for removal of particulate from the fluid, said filter portion being formed with upper and lower end portions;

means for intermittently drawing the fluid radially inwardly through said filter portion and then upwardly through one of said upper and lower end portions; and first and second rings connected to said upper and lower end portions, respectively, for maintaining said upper and lower end portions in first and second radial positions, respectively;

said filter portion being sufficiently flexible to collapse inwardly as the fluid flows therethrough such that said lower end portion is simultaneously drawn upwardly;

the weight of said second ring being sufficient to cause the lower end portion to drop downwardly and thus expand the filter portion outwardly when said fluid stops flowing so as to cause the particulate collected thereon to fall therefrom.

6. A filtering apparatus as defined in claim 5 in which said rings are the same diameter such that the filter portion hangs substantially vertically when the fluid is not flowing.

7. A filtering apparatus as defined in claim 5 further comprising means inwardly of said filter portion for limiting the collapsing movement of said filter portion.

8. A pre-filtering apparatus adapted for use with a vacuum cleaner, said vacuum cleaner having a canister with a generally open upper end and an inlet opening, a lid closing the upper end of the canister, a filter connected to the lid and extending downwardly in the canister, and a vacuum source connected to the lid for drawing contaminated air through the inlet opening of the canister and then through the filter when the vacuum cleaner is turned on, said apparatus comprising:

a dust bag having an open top and a generally closed bottom and having a generally tubular filter portion therebetween, said filter portion having upper and lower end portions and being sized to slip over and surround said filter such that the air flows through said pre-filter portion prior to reaching said filter;

means for removably connecting the top of the dust bag to the lid;

means for holding said upper end portion in a first radial position; and means for biasing said lower end portion downwardly and toward a second radial position;

said filter portion being sufficiently flexible to collapse inwardly as the air flows therethrough such that said lower end portion is drawn upwardly;

said biasing means generally expanding and straightening said filter portion when the vacuum cleaner is turned off.

9. A pre-filter apparatus as defined in claim 8 in which said holding means includes a first ring connected to said upper end portion, and in which said biasing means includes a second ring connected to said lower end portion, the weight of said second ring biasing said lower end portion downwardly.

10. A pre-filter apparatus as defined in claim 9 in which said rings are the same diameter such that said pre-filter portion hangs substantially vertically when the vacuum cleaner is turned off.

11. A pre-filter apparatus as defined in claim 9 in which said filter is a pleated filter, said apparatus further comprising a third ring connected to said pre-filter portion between said first and second rings.

* * * * *